(12) United States Patent
Kusic

(10) Patent No.: US 6,708,923 B2
(45) Date of Patent: Mar. 23, 2004

(54) AIRCRAFT SPIRALLING MECHANISM

(76) Inventor: Tom Kusic, GPO Box 932-G, Melbourne, Vic. (AU), 3001

( * ) Notice: Subject to any disclaimer, the term of this patent is extended or adjusted under 35 U.S.C. 154(b) by 0 days.

(21) Appl. No.: 09/886,639

(22) Filed: Jun. 22, 2001

(65) Prior Publication Data

US 2001/0054668 A1 Dec. 27, 2001

(30) Foreign Application Priority Data

Jun. 26, 2000 (AU) .............................................. PQ 8349

(51) Int. Cl.⁷ ................................................ B64C 9/08
(52) U.S. Cl. ........................ 244/34 R; 244/39; 244/3.1; 244/3.24
(58) Field of Search ................................ 244/34 R, 39, 244/67, 3.1, 3.23, 3.24, 45 A, 48, 90 R

(56) References Cited

U.S. PATENT DOCUMENTS

| | | |
|---|---|---|
| 3,603,533 A | 9/1971 | Stripling |
| 4,565,340 A | 1/1986 | Bains |
| 4,964,593 A | 10/1990 | Kranz |
| 5,048,772 A | 9/1991 | Wisshaupt |
| 5,322,243 A | 6/1994 | Stoy |
| 5,975,461 A | 11/1999 | Ullrich |

FOREIGN PATENT DOCUMENTS

JP             94/6-26799        2/1994

*Primary Examiner*—Michael J. Carone
*Assistant Examiner*—Gabriel S. Sukman

(57) ABSTRACT

An aircraft 1 in the form of an airplane with a spiral inducing assembly 2 which is capable of inducing the airplane to travel in a continuous spiralling motion without rolling. Two fins 3 and 4 are attached to a tube 5 that is able to rotate around the encircled part of the fuselage. The fins 3, 4 are able to rotate in a pivoting manner on the rotatable tube 5 with respect to the rotatable tube 5, thereby changing their pitch relative to the longitudinal axis of the rotatable tube 5. Fin 3 is larger than fin 4. The diferene in sizes between the fins makes the larger fin 3 exert a greater force on the rotatable tube 4 than the smaller fin 4 when the fins are pitched in unison. The aerodynamic imbalance between the fins thus casues the rotatable tube 5 to rotate. When pitched at an angle to the longitudinal axis in unison, both fins 3, 4 would exert a lateral force on the rotatable tube 5. Thus, as well as forcing the rotatable tube 5 to rotate, the fins 3, 4 would also push the rotatable tube sideways. But as the rotatable tube is pushed sideways, it rotates, and hence the lateral direction of push constantly revolves, causing a spiralling motion when in flight.

9 Claims, 23 Drawing Sheets

AIRCRAFT SPIRALLING MECHANISM

Figure 1:
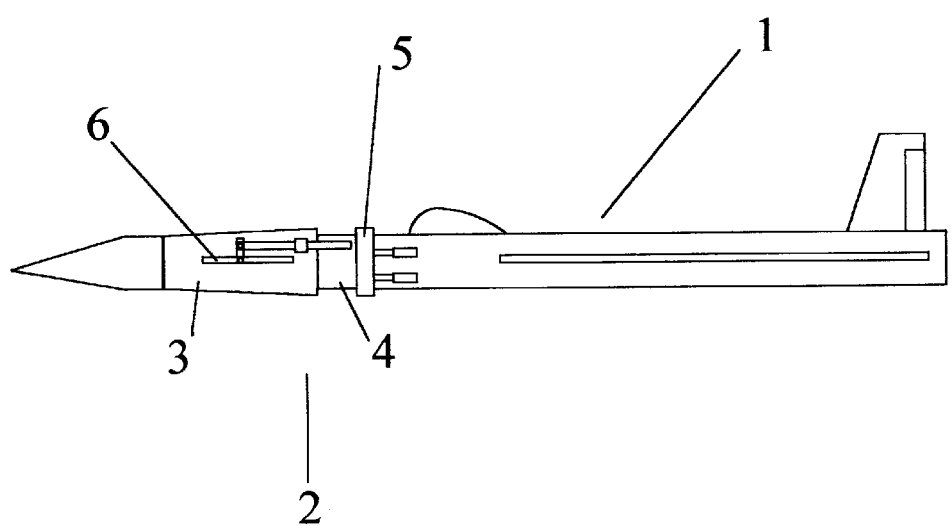

The aim of this invention is to provide an aircraft that has higher chance of surviving attacks from anti-aircraft weapons when flying over enemy territory than aircraft currently in use. The aircraft according to this invention is fitted with a mechanism that enables the aircraft to travel in a continuous spiralling motion while flying over enemy teritorry, without the need for the pilot to make continuous control adjustments. The mechanism is such that once activated, the spiralling motion is automatic. The mechanism can aslo be dis-engaged by the pilot when so desired. The spiralling motion is achieved during flight without rolling the aircraft.

While a pilot flying a conventional aircraft such as a jet fighter could make the conventional aircraft fly in a spiralling motion, this could only be achieved if the pilot kept making continuous control changes with his own arm. This could become quite tiresome and strenuous after a while and would require continued concentration, if the spiralling was achieved without rolling the aircraft. Rolling the aircraft, as in the form of a barrel roll, may seem like an easy alternative, but continuous rolling would make the pilot dizzy after a while, leading to loss of control, and if close to the ground, a potential for a crash. A continuous rolling motion would also make it hard for the pilot to observe enemy territory, navigate and make target selection. That is, using a sustained rolling motion in order to achieve a prolonged spiralling motion would not be practical.

The aircraft in this invention would allow the pilot to operate conventional controls in a conventional manner, as when flying in a smooth manner, while the aircraft continued to travel in a spiralling motion. The advantage of this is that the pilot would be able to continue to observe enemy territory and would be free to concentrate on targeting enemy sites while the aircraft flew in an evasive manner.

In this invention the spiralling motion of a fast flying aircraft is achieved using moveable fins on a rotatable tube, with the tube encircling a part of the aircraft (preferrably the front area of the aircraft) and able to rotate around the encircled part of the aircraft. Fitted to an aircraft that is in the form of a jet propelled aeroplane, the rotatable tube would preferrably be fitted so as to encircle part of the fuselage.

The fins are attached to the rotatable tube so that they can be rotated in a pivoting manner relative to the rotatable tube. That is, if the rotatable tube was kept in a fixed position on the aircraft so as not to rotate, the fin movement would resemble the movement of canards on aircraft such as the Eurofighter and the recent version of the Sukhoi Su-31. The fins would turn in a pitch altering motion in the same direction. With the fins horizontal, the aircraft would be able to fly smoothly. When the fins are rotated from the horizontal position, they would act to push the aircraft in a similar manner to the way that canards would (if positioned on the front of the aircraft).

For the aircraft to enter a spiralling motion, the fins would need to revolve around the body of the aircraft so that the aircraft is pushed in changing directions. In the invention this is achieved by using the rotatable tube, that allows the fins to revolve around the body of the aircraft—using the rotatable tube as means of travelling around a part of the body of the aircraft. The invention provides a number of means by which rotation of the rotatable tube can be achieved. One way is to use fins that are of unequal size with respect to one another. Having fins that are of unequal size would cause an aerodynamic imbalance when the fins are moved from the horizontal position. With one fin pushing harder than the other, rotation of rotatable tube would result.

The rotation of the rotatable tube would be automatic and continuous while the imbalance between the fins was maintained. Placing the fins back in a horizontal position would remove the imbalance, allowing the rotatable tube to come to rest. Friction between the aircraft and the rotatable tube or a braking mechanism such as a hydraulicly activated brake pad being push against the rotatable tube could help to stop the rotatable tube from rotating.

Another way of causing the rotatable tube to rotate according to the invention is to increase the pitch of one fin more than that of the other. Increasing the pitch of one fin relative to the other would cause an aerodynamic imbalance on the rotatable tube, thereby forcing it to rotate. Allowing the fins to return to a horizontal position would remove the aerodynamic imbalance, allowing the rotatable tube to come to rest.

Although the aircraft could be in the form of a jet propelled aeroplane, it could be in the form of any one of a range of aircraft such as guided missiles and unguided missiles. It could also be in the form of un-propelled aircraft such as gliders or winged bombs that are designed to glide to a target.

FIG. 1 shows one form of the aircraft. Shown in FIG. 1 is the aircraft 1 as a jet propelled aeroplane 1, fitted with a spiral inducing assembly 2.

Referring to FIG. 1, a rotatable tube 3 forming part of the spiral inducing assembly 2 can be seen encircling part of the fuselage 4 of the aeroplane 1. Referring to this tube 3 as the primary tube 3, the primary tube 3 is able to rotate around the part of the aircraft encircled by the primary tube. The primary tube is shown as being narrower in the front than at the rear. Also shown is another tube 5 that is fitted to the aircraft such that it encircles part of the fuselage 4 of the aircraft. Referring to this tube 5 as the activation tube 5, the activation tube 5 is fitted so that it can be moved in a forward direction relative to the part of the fuselage 4 encircled by the activation tube and then back to its original position on the fuselage. FIG. 1 also shows the edge of one horizontal fin 6 that is connected to the outside of the primary tube 3. The fin 6 is connected to the outside of primary tube 3 such that it can rotate in a pivoting manner as shown in FIG. 2.

Figure 1A:
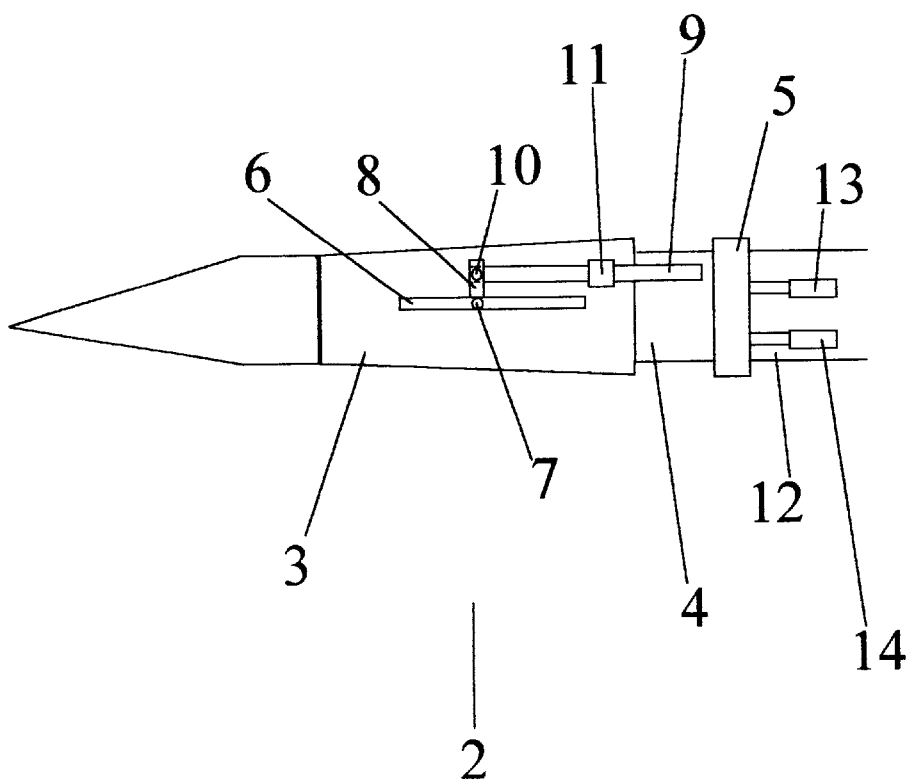

FIG. 1A shows an enlarged illustration of the left side of the spiral inducing assembly 2. The fin 6 in FIG. 1A is connected to the outside of the primary tube 3 by a connecting joint 7 which is in the form of a connecting rod 7. Extended from the connecting rod 7 in FIG. 1A is a protruding section 8 which is used to rotate the connecting rod 7. Rotation of the connecting rod 7 causes the fin 6 to rotate in a pivoting manner around the connecting rod 7 (in the manner shown in FIG. 2). Linked to the protruding section 8 in FIG. 1A is a stem 9. Referring to this stem 9 as an activation stem 9, the activation stem 9 is used as a means for pushing the protruding section 8 such that when the protruding section 8 is pushed, the protruding section 8 forces the connecting rod 7 to rotate around the longitudinal axis of the connecting rod 7. The activation stem 9 is linked to the protruding section 8 by a rivet 10. The activation stem 9 is shown as being fitted on the outside of the primary tube 3 and is supported on the primary tube 3 by a retaining bracket 11. The retaining bracket 11 is rigidly joined to the primary tube but is channelled to allow the activation stem 9 to move longitudinally between the retaining bracket 11 and the primary tube 3. The activation stem 9 is allowed to protrude rearward from the primary tube so that it can be reached by the activation tube 5 when the activation tube 5 is moved forward on the fuselage 4. The activation tube 5 is forced to move forward by an activation mechanism 12 consisting of hydraulicly activated extendable rods 13 and 14. FIG. 3 shows the hydraulicly activated extendable rods 15 and 16 located on the right side of the spiral inducing assembly 2 which also form part of the activation mechanism 12 by which the acivation tube 5 is forced to move. When the hydraulicly activated extendable rods 13 14 15 and 16 are forced to extend as hydraulic pressure is applied to them, they force the activation tube 5 to move forward as shown in FIG. 2. FIG. 2 shows that as the activation tube 5 is forced to move forward on the fuselage 4 when the hydraulicly activated extendable rods 13 and 14 extend, it eventually makes contact with the activation stem 9. As the activation tube 5 is forced to move further forward, it pushes the activation stem 9 forward on primary tube. As the activation stem 9 is pushed forward, the activation stem pushes against the protruding section 8 and moves the protruding section 8, thereby rotating the fin 6 around the connecting rod 7 in a pivoting manner.

Figure 2:
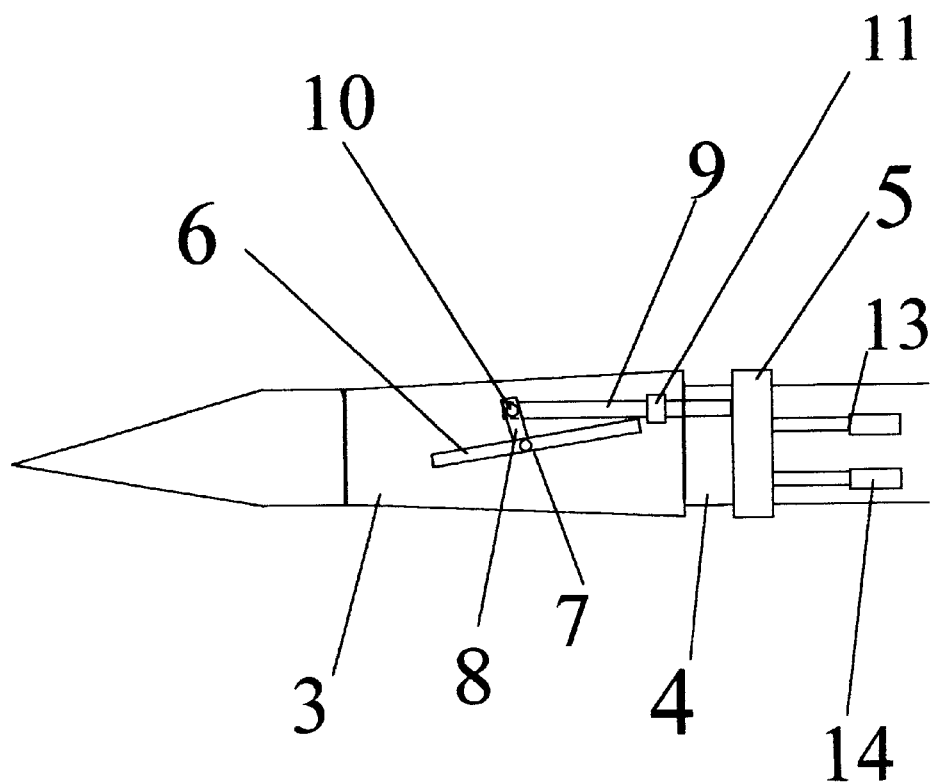
Figure 3:
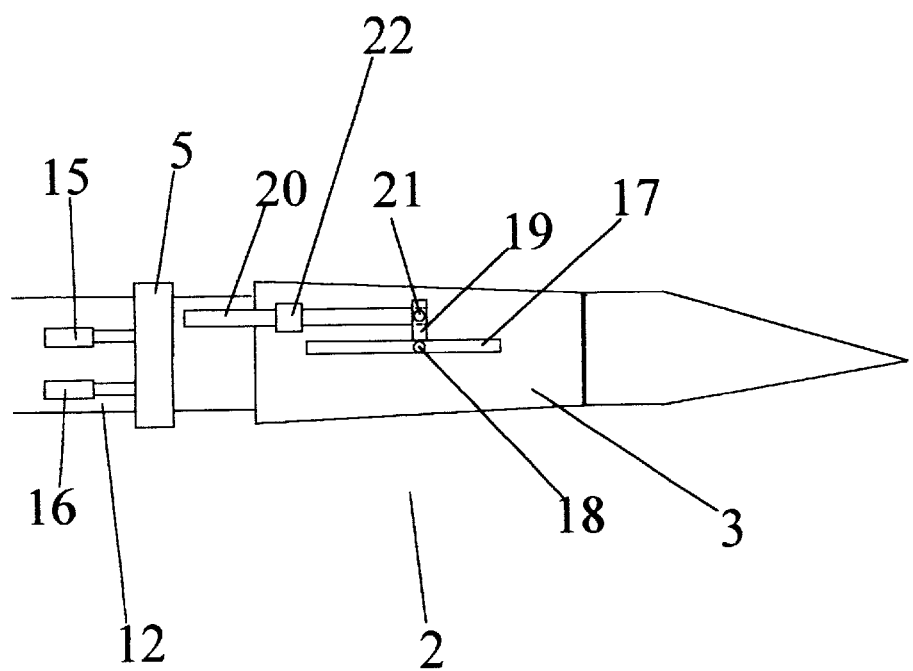

In FIG. 2 a rivet 10 is shown connecting the activation stem 9 to the protruding section 9, which allows movement between the activation stem 9 and the protruding section 8. The retaining bracket 11 keeps the activation stem from moving laterally around the primary tube. The retaining bracket 11 however does allow longitudinal sliding movement of the activation stem 9 so that it can be pushed and moved by the activation tube 5.

FIG. 3 shows the the right side of the spiral inducing assembly 2 of FIG. 1. Shown is another fin 17, another connecting joint 18 in the form of a connecting rod 18 that connects the fin 17 to the outside of the primary tube 3. Another protruding section 19 is used to rotate the connecting rod 18, and the activation stem 20 is used to push the protruding section 19, with the activation stem 20 linked to the protruding section 19 by a rivet 21. Also visible in FIG. 3 is the activation tube 5. The connecting rod 18 allows the fin 17 to rotate in a pivoting manner. Another retaining bracket 22 is shown supporting the respective activation stem 20.

Thus, it can be seen from FIGS. 1, 1A, 2 and 3 that the activation tube 5, the activation stems 9 and 20, retaining brackets 11 and 22, protruding sections 8 and 19, rivets 10 and 21 used to connect the activation stems 9 and 20 to respective protruding sections 8 and 19, the connecting joints 7 and 18 in the form of connecting rods 7 and 18, and the activation mechanism 12 used to move the activation tube 5 consisting of the hydraulicly activated extendable rods 13, 14, 15 and 16, collectively form a fin rotating mechanism.

Figure 4:
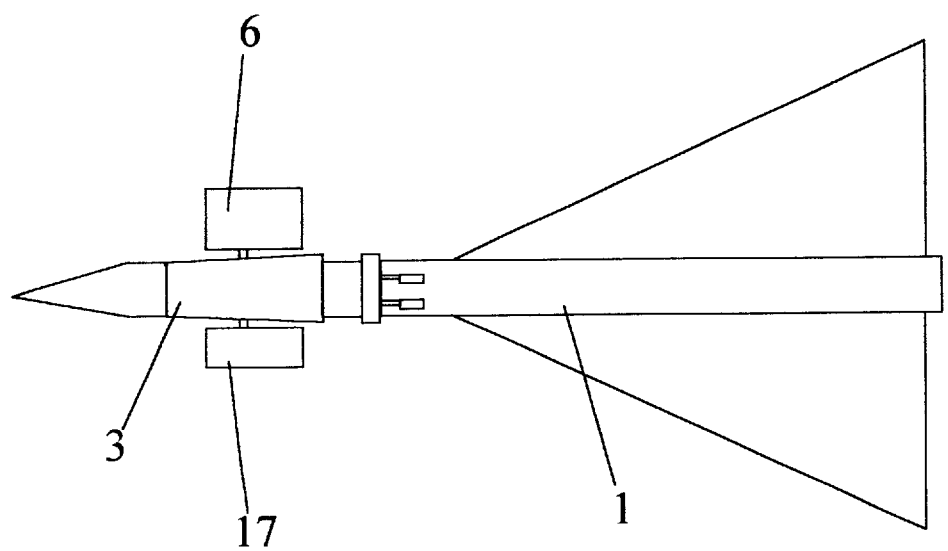

FIG. 4 shows the aeroplane 1 of FIG. 1 from underneath. It shows that one fin 6 is larger than the other fin 17. When these fins 6 and 17 are rotated in a pivoting manner and in the same direction to the same extent, an aerodynamic imbalance between the fins 6 and 17 arises during flight of the aeroplane because of size difference between the fins 6 and 17. The larger fin 6 will exert a greater magnitude of force on the primary tube 3 during flight of the aeroplane 1 than the smaller fin 17. As a result, the aerodynamic imbalance between the fins 6 and 17 would cause the primary tube 3 to rotate. But both fins 16 and 17 would also be pushing the aircraft laterally, in a similar manner to canards. Thus, because the primary tube 3 is forced to rotate, the lateral force exerted on the aeroplane by the fins 6 and 17 keeps changing, thus forcing the aeroplane to keep changing its direction and hence entering a spiralling motion.

Figure 5:
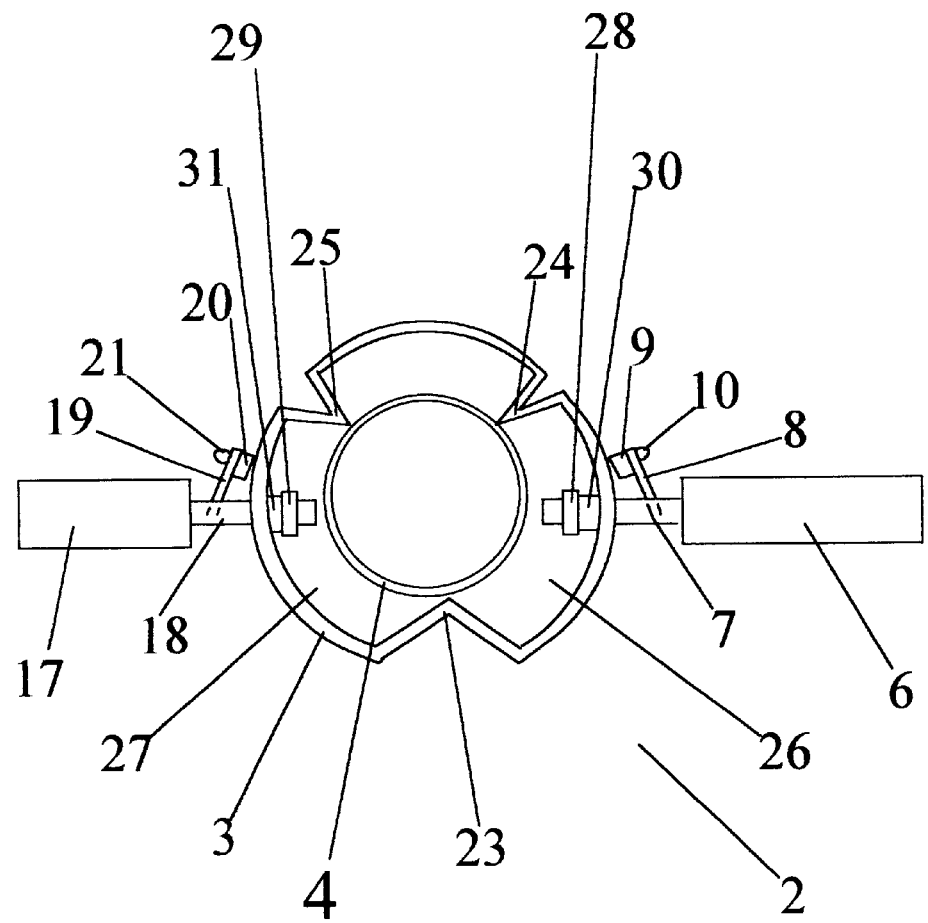

FIG. 5 shows the front cut out of the spiral inducing assembly 2 of figure 1. Shown here is the primary tube 3, the fins 6 and 17, (with fin 6 being larger than fin 17), the fuselage 4 of the aeroplane, the activation stems 9 and 20, linked by rivets 10 and 21 to the protruding sections 8 and 19 respectively, the connecting rods 7 and 18 penetrating the primary tube 3, and with the protruding sections 8 and 19 screwed in the connecting rods 7 and 18 respectively. FIG. 5 shows the primary tube 3 as being creased in sections 23, 24 and 25. The creased sections 23, 24 and 25 are used as a means to support the primary tube 3 on the on the encircled part of the fuselage 4, while allowing for gaps 26 and 27 to exist between the primary tube 3 and the encircled part of the fuselage 4. The gaps 26 and 27 allow the connecting rods 7 and 18 to protrude inwardly through the primary tube 3 without making contact with the encircled part of the fuselage 4. Securing bolt nuts 28 and 29 are shown securing the connecting rods 7 and 18 to the primary tube 3, with thrust bearings 30 and 31 allowing for easy rotation of the connecting rods 7 and 18 around their respective longitudinal axes.

Figure 6:
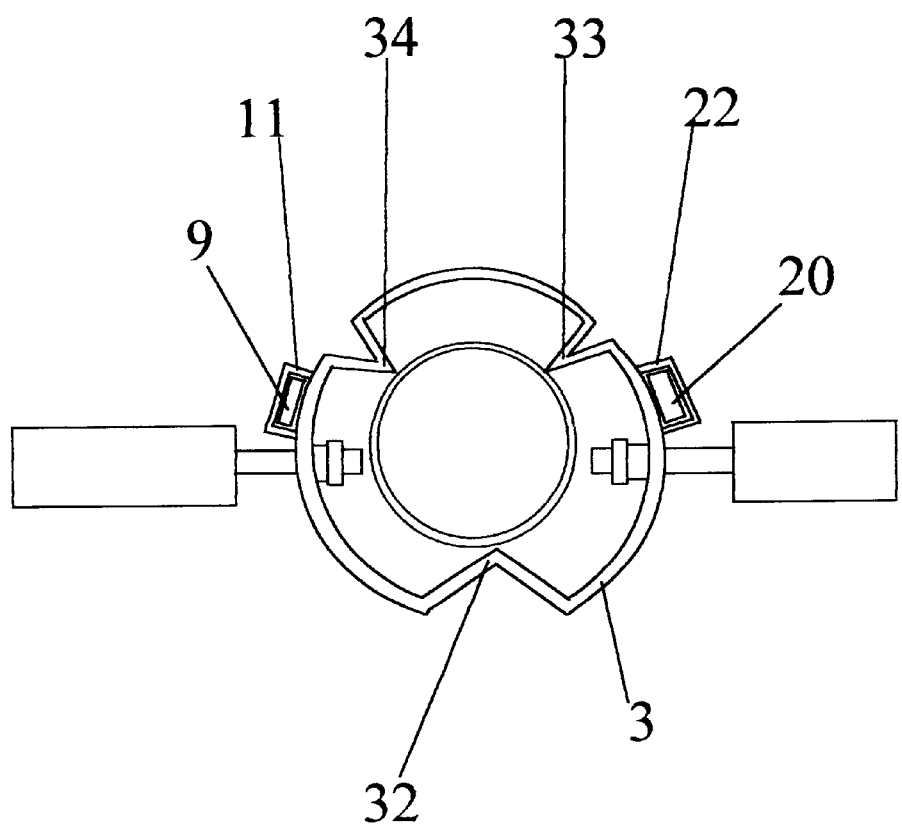

FIG. 6 shows the rear of the primary tube 3 of FIG. 1 as a cut out. Shown in FIG. 6 are the rear ends of the activation stems 9 and 20, and the retaining brackets 11 and 22 that support the activation stems 9 and 20, and prevent uncontrolled lateral movement of the activation stems 9 and 20. The primary tube 3 is shown as having sections creased 32, 33 and 34.

The primary tube can be formed in various geometric shapes, including cylindrical or cone shaped.

Figure 7:
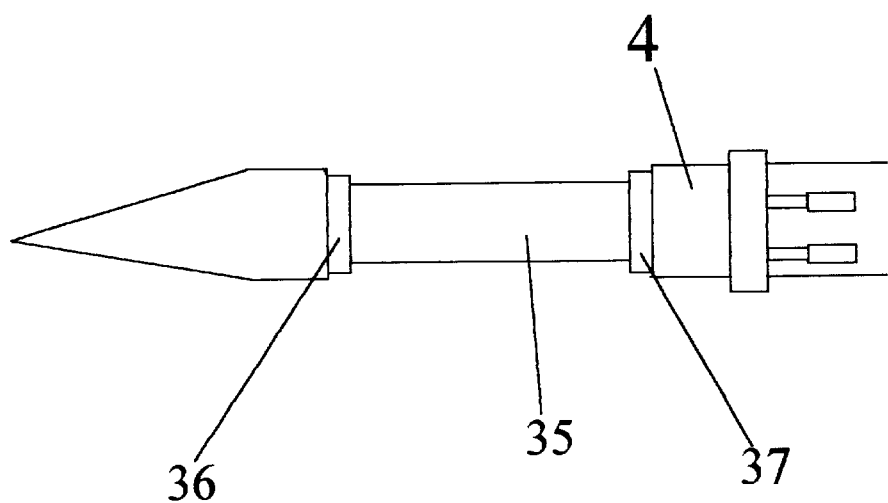

FIG. 7 shows a side cutting of the part of the fuselage 35 encircled by the primary tube 3 of FIG. 1. The encircled part of the fuselage 35 can be seen to be narrower than the rest of the fuselage 4. Thrust bearings 36 and 37 are positioned on the narrowed section of fuselage 35. The thrust bearings are used to support the primary tube and to prevent the primary tube moving longitudinally relative to the fuselage 4.

Figure 8:
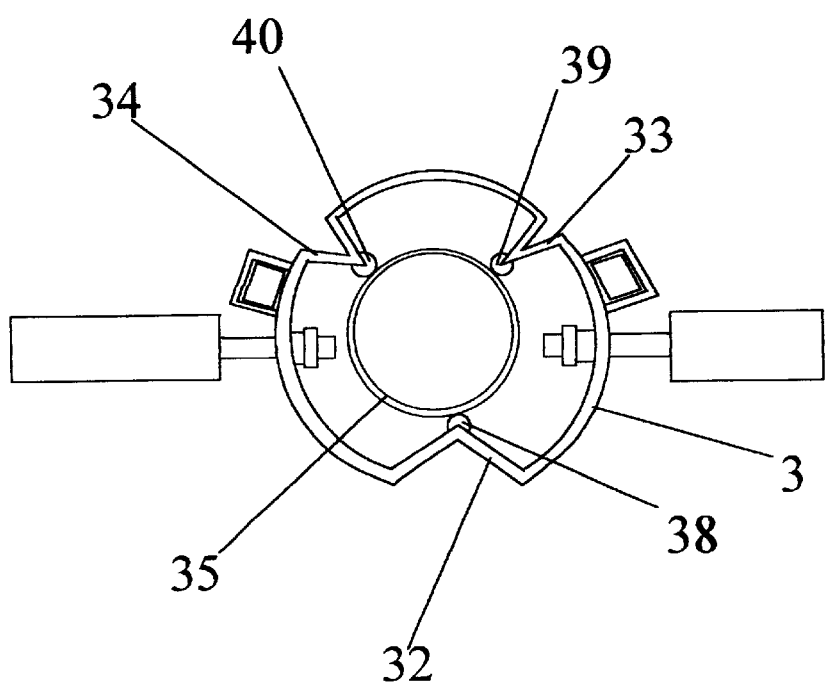

FIG. 8 shows another way that the primary tube 3 of FIG. 6 can be supported, with wheels 38, 39 and 40 attached to the creased sections 32, 33 and 34 of the primary tube 3. The wheels 38, 39 and 40 help to support the primary tube 3 on the encircled part of the fuselage 35.

Figure 9:
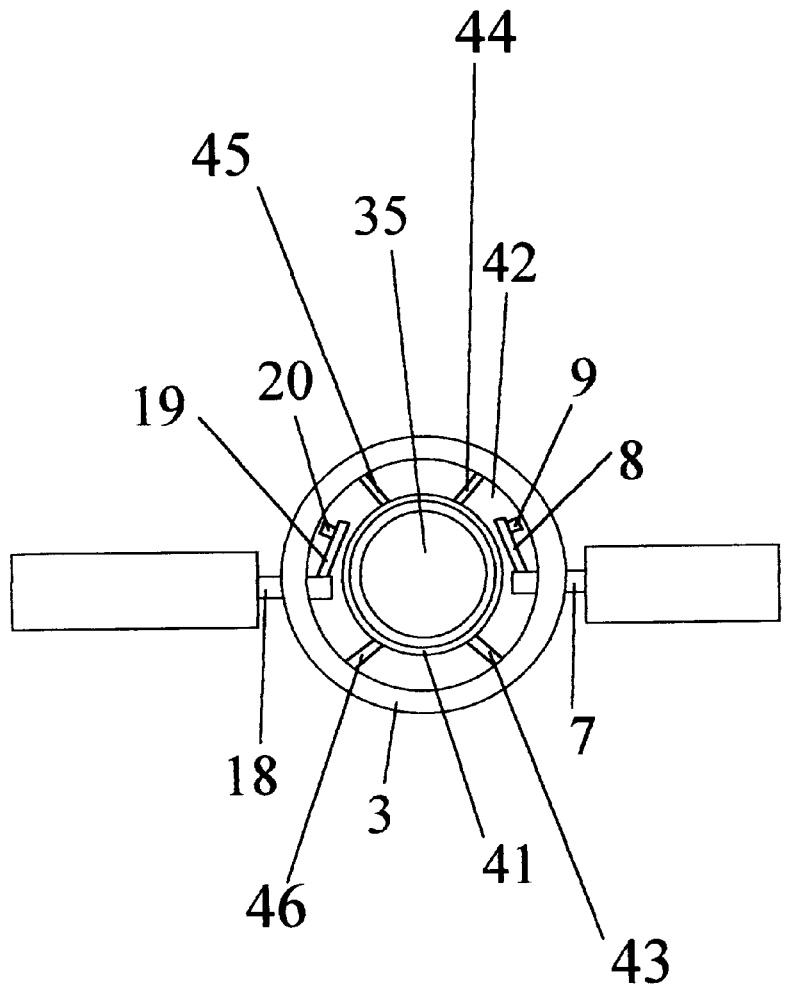

FIG. 9 shows another way of supporting the primary tube 3. Shown is tube of smaller diameter 41 than the primary tube 3. This smaller tube 41 is a supporting tube 41 in that it can be used to support the primary tube 3. It has a smaller diameter than the primary tube 3 to provide a gap 42 between the primary tube 3 and the supporting tube 41. The gap 42 is used to allow freedom of movement to the protruding sections 8 and 19, and the activation stems 9 and 20 shown positioned inside the primary tube 3. The protruding sections 8 and 19 and the connecting rods 7 and 18 have been formed as moulded units, allowing easier assembly. Bolts 43, 44, 45 and 46 are used to join the primary tube 3 to the supporting tube 41. The supporting tube 41 is able to rotate around the encircled part of the fuselage 35.

Figure 9A:
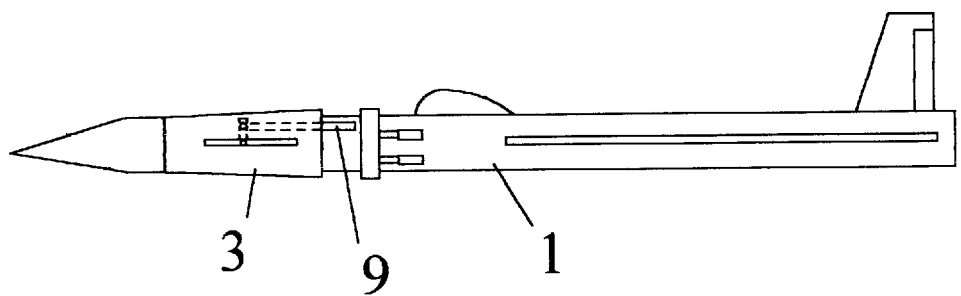

FIG. 9A shows a side view of an aircraft 1 using the fin rotating mechanism of FIG. 9. The activation stem 9 of FIG. 9 can be seen to be protruding rearward from inside the primary tube 3.

Figure 10:
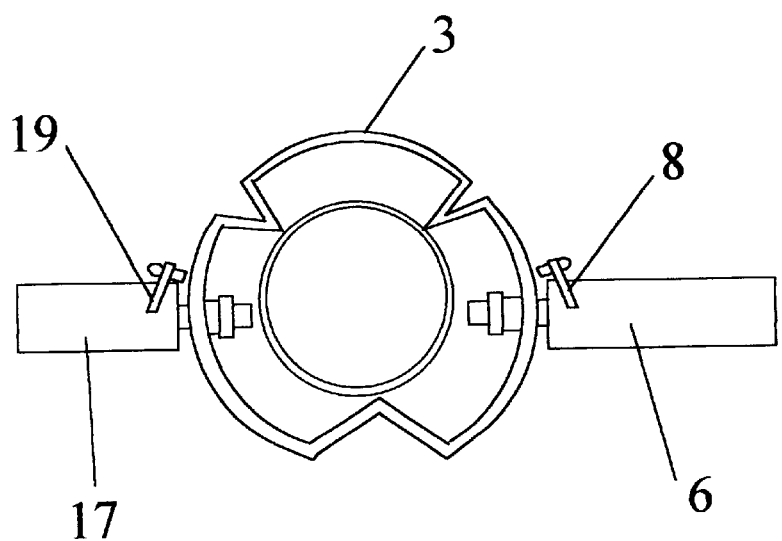

FIG. 10 shows a cut out of the front of the primary tube 3 of FIG. 1, but with the protruding sections 8 and 19 protruding from the fins 6 and 17 respectively.

Figure 11:
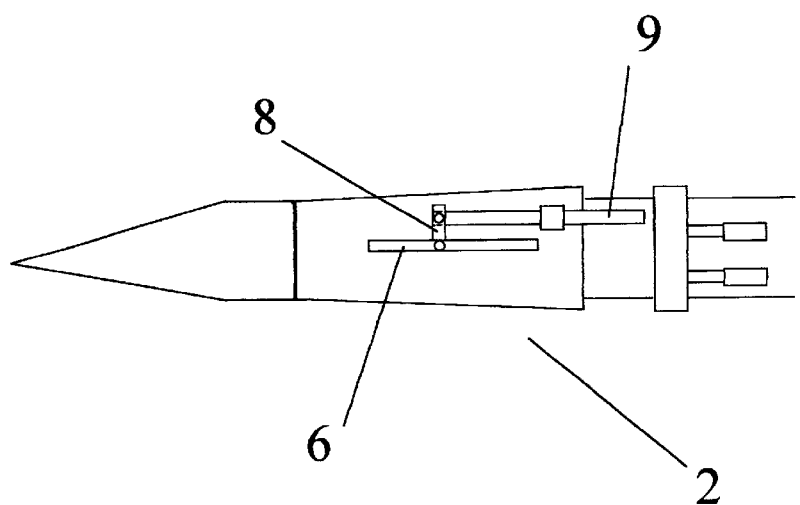
Figure 12:
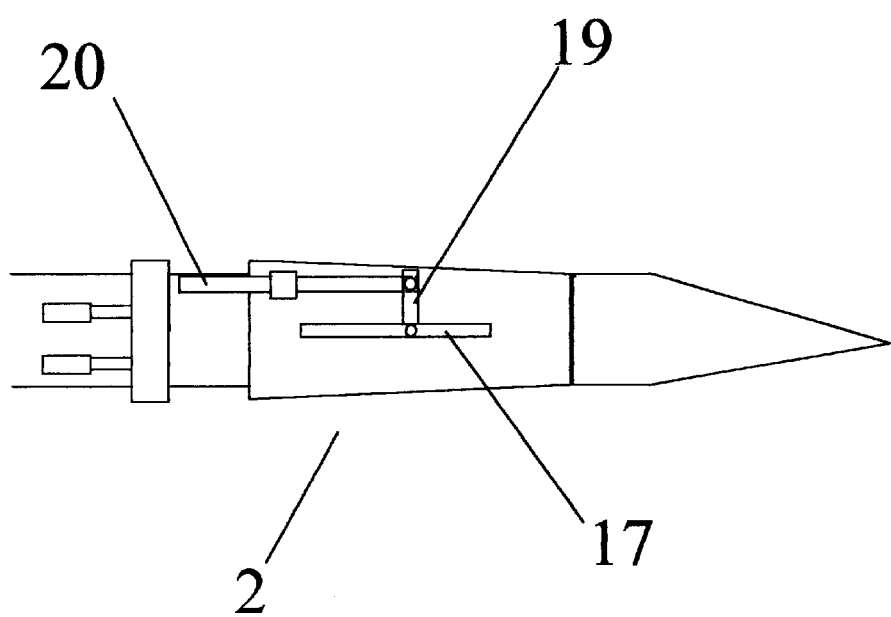

FIGS. 11 and 12 show another manner in which the aerodynamic imbalance between the fins can be created during forward flight.

In FIG. 11 the protruding section 8, on the left side of the spiral inducing assembly 2 is shorter than the protuding section 19 in FIG. 12 on the right side of the spiral inducing assembly 2. The shorter protruding section 8 would generate a greater degree of movement of fin 6 in FIG. 11 than the movement of fin 17 that the protruding section 19 would cause in FIG. 12 for an equal movement in the respective activation stems 9 and 20. An aerodynamic imbalance between the fins could thus be created.

Figure 13:
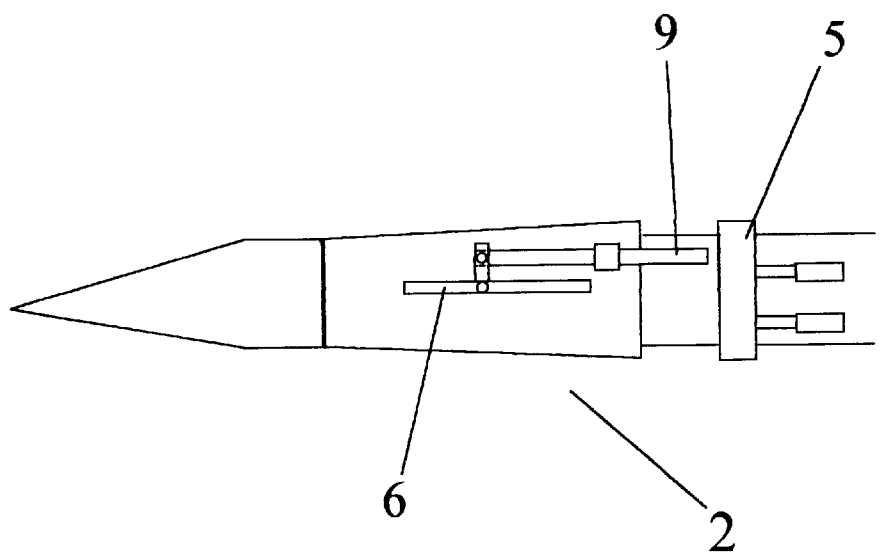
Figure 14:
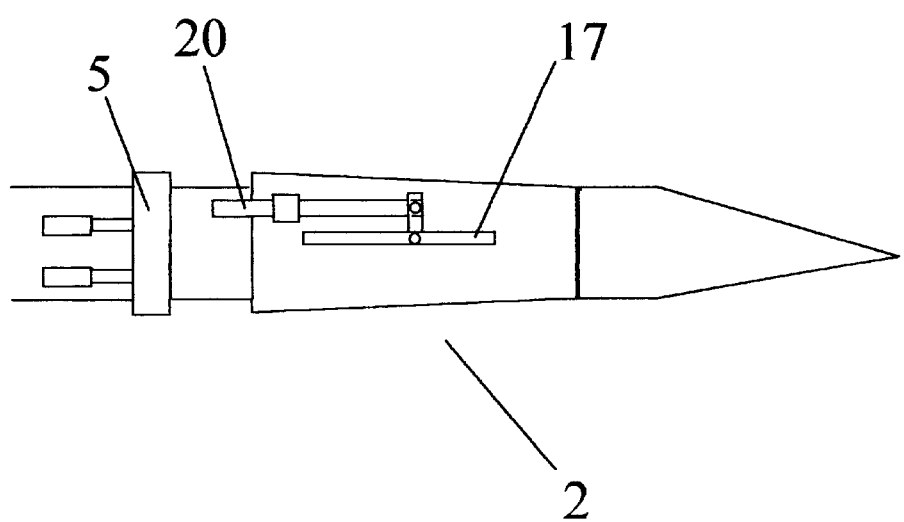

FIGS. 13 and 14 show the left and right sides of the spiral inducing assembly 2 of another arrangement for creating an aerodynamic imbalance between the fins 6 and 17. FIG. 14 shows the activation stem 20 on the right side as being shorter than the activation stem 9 on the left side in FIG. 13. Hence when the activation tube 5 is moved forward, it first starts pushing the activation stem 9 in FIG. 13, forcing fin 6 to rotate, and then when the activation tube 5 later starts pushing the activation stem 20 of FIG. 14, the activation tube 5 will continue pushing the longer activation stem 9 of FIG. 13, forcing the fin 6 in FIG. 13 into a higher degree of rotation, or pitch, than fin 17 of FIG. 14, at all times until both fins are allowed to become horizontal again by the activation tube 5 being allowed to retreat.

Figure 15:
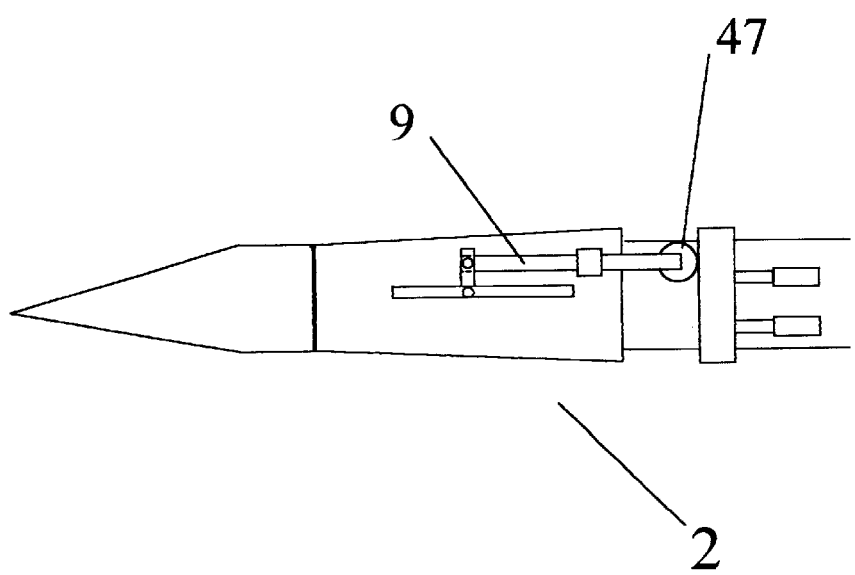

FIG. 15 shows a spiral inducing assembly 2 with a wheel 47 fitted to the connecting stem 9. The wheel 47 would reduce frictional forces between the activation stem 9 and the activation tube 5 as the activation stem travels around the activation tube 5 when the primary tube is rotating.

Figure 16:
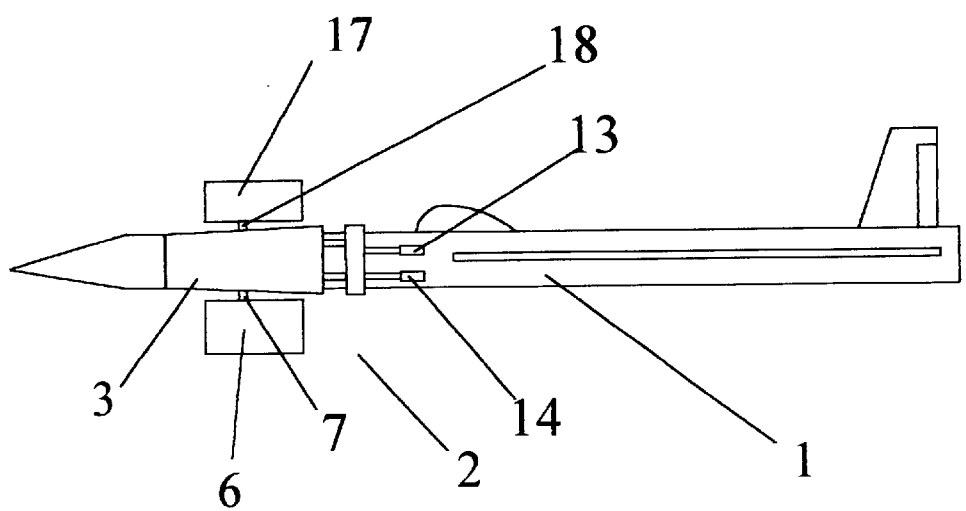

FIG. 16 shows the spiral inducing assembly of FIG. 4 with the fins 6 and 17 of FIG. 4, and with the primary tube 3 in a state of rotation. It can be seen comparing FIG. 4 with FIG. 16 how the lateral forces on the aircraft would be constantly changing, enabling the spiral inducing assembly 2, to force the aircraft 1 to travel in a continuous spiralling motion.

Looking at the fins 6 and 17 shown in FIG. 16 it can be seen that the rear section of each fin behind the respective connecting rods 7 and 18 is greater than the section of each fin in front the respective connecting rods 7 and 18. This is deliberate. This is used to allow the fins to adopt a horizontal position when hydraulic pressure is released from the hydraulicly activated extendable rods 13, 14 (and 15 and 16 of FIG. 3) allowing the activation tube 5 to retreat away from the primary tube 3. Aerodynamic forces are in effect used to allow the fins to return to a resting horizontal position, allowing the aeroplane to re-commence a smooth non-spiralling flight. Friction between activation the activation tube 5 and activation stems 9 and 20 caused by the rotation of the activation stems 9 and 20 around the activation tube (since the activation stems rotate with the primary tube) can be used as a means of slowing the rotation of the primary tube when smooth flight is desired. The braking mechanisms shown in FIGS. 17 and 18 could also be used as a means of slowing the primary tube when smooth flight needs to be resumed.

Figure 17:
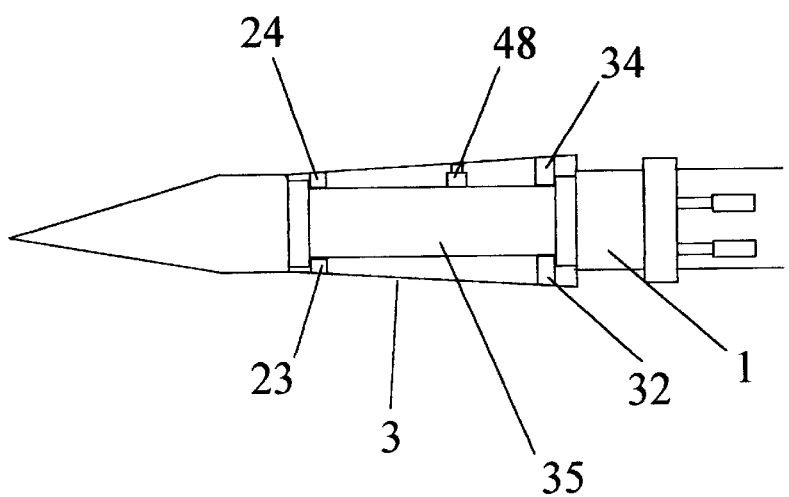

FIG. 17 shows a side cutting of the primary tube 3 and the part of the fuselage 35 encircled by the primary tube 3. Shown here is a hydraulicly activated extendable rod 48 attached to the encircled part of the fuselage 35, in an extended form. Extended it creates friction on the primary tube 3 and acts as a brake to help slow the primary tube 3 when the spiral inducing assembly is de-activated. Using a braking system lightly would allow the primary tube 3 to rotate, but would intensify the lateral forces on the aircraft. To allow use of a braking mechanism, the primary tube 3 would be kept smooth and round in the area that fricion is induced. Any creased sections 23, 24, 32, 34 would be restricted to areas where the hydraulicly extendable rod 48 would not make contact.

Figure 17A:
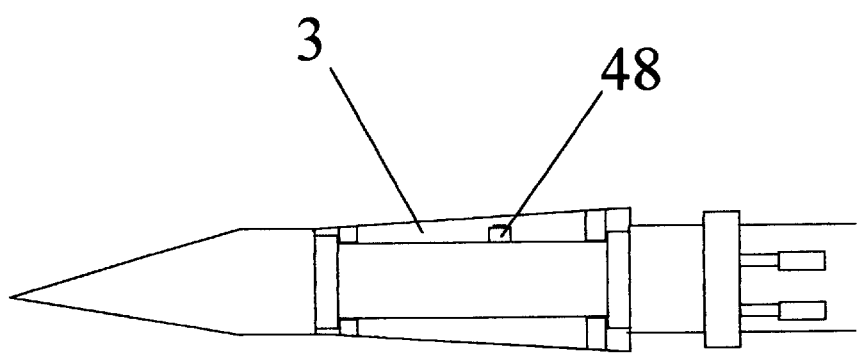

FIG. 17A shows the hydraulicly activated extendable rod 48 in a compressed state, as when the primary tube 3 is allowed to freely rotate.

Figure 18:
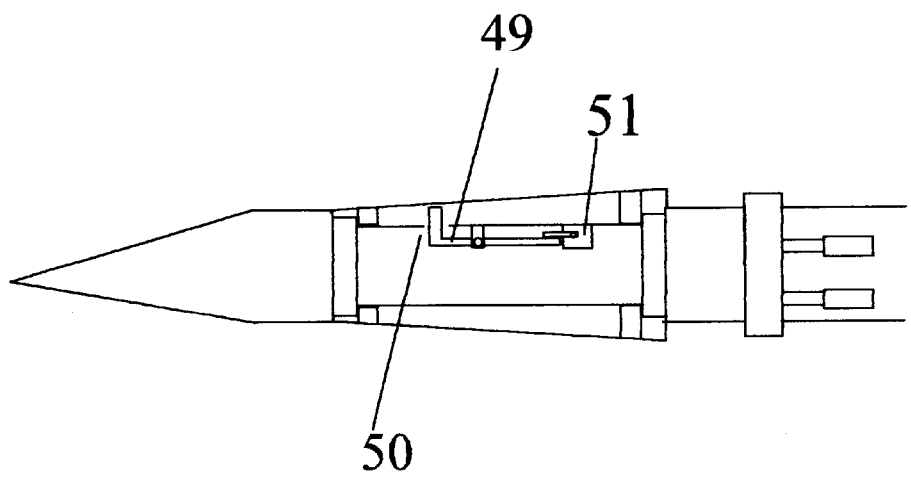

FIG. 18 shows another braking mechanism where a lever is used to slow the primary tube. The lever 49 is shown protruding from a hole 50 in the fuselage, and is operated by an actuator in the form of an electric motor 51.

Figure 19:
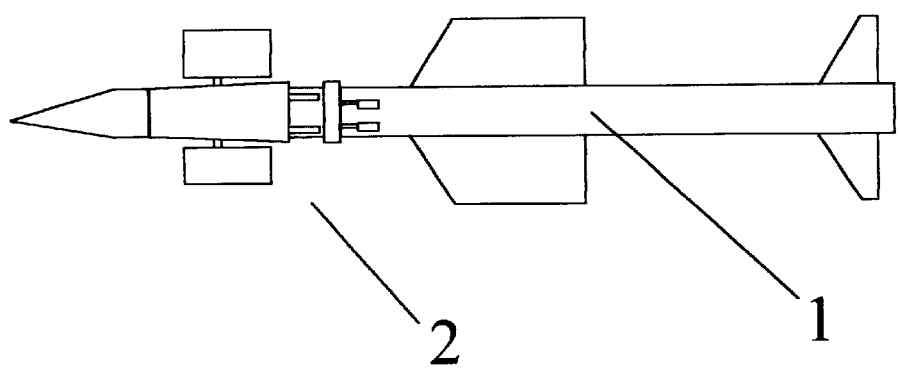

FIG. 19 shows the aircraft 1 in the form of a missile 1 with a spiral inducing assembly 2 of FIG. 1.

Figure 20:
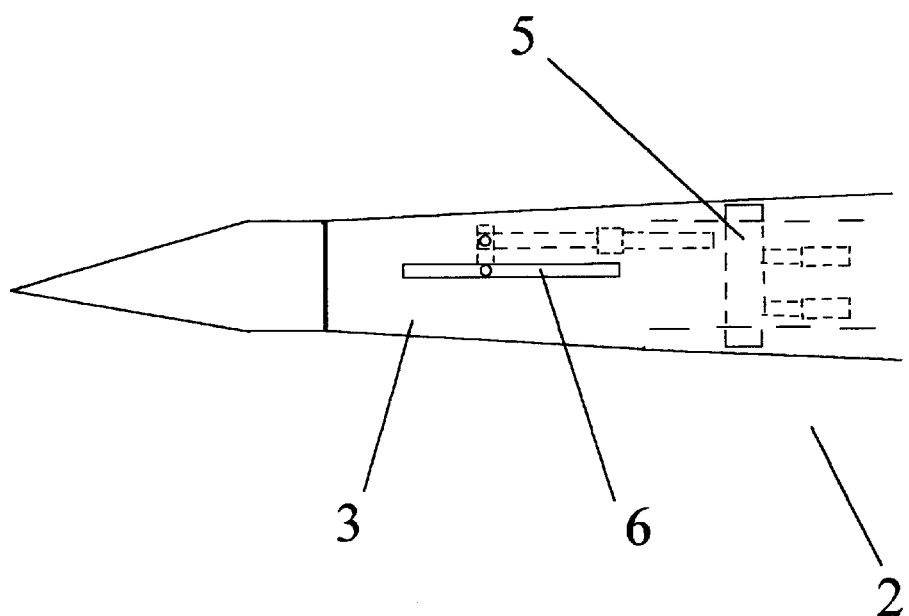

FIG. 20 shows a spiral inducing assembly 2 where the primary tube 3 extends over the activation tube 5, but the fin 6 is located on the outside of the primary tube.

The claims defining this invention are as follows:

1. An aircraft comprising a spiral inducing assembly, said spiral inducing assembly providing means by which the aircraft can be forced to travel in a spiralling motion during flight of the aircraft, and which spiral inducing assembly comprises a tube, a plurality of fins connected to the tube such that the fins can be rotated in a pivoting manner relative to the tube, and a fin rotating mechanism by which fin rotating mechanism the said fins can be rotated in the said pivoting manner in the same direction, which said tube is a primary tube, and which primary tube encircles part of the aircraft and is able to rotate relative to the encircled part of the aircraft, and which fin rotating mechanism is such that by means of the fin rotating mechanism the fins can be rotated in the said pivoting manner and in the same direction such that one of the fins can be rotated to a greater degree relative to the primary tube than can another of the said fins.

2. The aircraft of claim 1
   wherein the said fins are positioned on the exterior of the primary tube.

3. The aircraft of claim 1
   wherein the said aircraft is an aeroplane.

4. The aircraft of claim 1
   wherein the said aircraft is a missile.

5. An aircraft comprising a spiral inducing assembly, said spiral inducing assembly providing means by which the aircraft can be forced to travel in a spiriting motion during flight of the aircraft, and which spiral inducing assembly comprises a tube, a plurality of fins connected to the tube such that the fins can be rotated in a pivoting manner relative to the tube, and a fin rotating mechanism by which fin rotating mechanism the said fins can be rotated in the said pivoting manner in the same direction, which said tube is a primary tube, and which primary tube encircles part of the aircraft and is able to rotate relative to the encircled part of the aircraft, and with one of the said fins, a primary fin, connected to the primary tube such that the primary fin is located on the outside of the primary tube, and another of the said fins, a secondary fin, connected to the primary tube such that the secondary fin is located on the outside of the primary tube, with the primary fin connected to the primary tube by means of a connecting joint such that the primary fin can be rotated relative to the primary tube in a pivoting manner, which connecting joint is a primary connecting joint and which primary connecting joint has a protruding section, which protruding section is a primary protruding section, and which primary protruding section is connected to a stem, which stem is a primary activation stem, with the secondary fin connected to the primary tube by means of a connecting joint such that the secondary fin can be rotated relative to the primary tube in a pivoting manner, which said connecting joint that connects the secondary fin to the primary tube is a secondary connecting joint and which secondary connecting joint has a protruding section that is a secondary protruding section, and which secondary protruding section is connected to a stem that is a secondary activation stem, with another tube that is an activation tube, and which activation tube is positioned on the aircraft such that the activation tube encircles part of the aircraft and such that the activation tube can be moved relative to the primary tube, which activation tube can be moved forcefully relative to the primary tube by means of an actuation mechanism, such that by forcefully moving the activation tube relative to the primary tube, pressure can be applied to the primary activation stem and the secondary activation stem by means of the movement of the activation tube and such that the primary activation stem and secondary activation stem can be pushed by movement of the activation tube, and as the primary activation stem is pushed the primary protruding section of the primary connecting joint is moved such that the primary connecting joint is rotated, and such that as the primary connecting joint is rotated, the primary fin is rotated relative to the primary tube, and as the secondary activation stem is pushed the secondary protruding section of the secondary connecting joint is moved such that the secondary connecting joint is rotated and such that as the secondary connecting joint is rotated, the secondary fin is rotated relative to the primary tube, and which fin rotating mechanism comprises the primary protruding section, the secondary protruding section, the primary activation stem, the secondary activation stem, the primary connecting joint, the secondary connecting joint, the activation tube and the actuation mechanism, and which fin rotating mechanism is such that by means of the fin rotating mechanism the fins can be rotated in the said pivoting manner and in the same direction such that during flight of the aircraft one of the fins connected to the primary tube can continuously exert a greater magnitude of force on the primary tube than can another of the said fins that is connected to the primary tube, with the length of one activation stem shorter than the length of another activation stem such that during flight of the aircraft one of the said fins can be made to exert a greater magnitude of force on the said primary tube than another fin by means of the length of one activation stem being shorter relative to the length of another activation stem.

6. An aircraft comprising a spiral inducing assembly, said spiral inducing assembly providing means by which the aircraft can be forced to travel in a spiralling motion during flight of the aircraft, and which spiral inducing assembly comprises a tube, a plurality of fins connected to the tube such that the fins can be rotated in a pivoting manner relative to the tube, and a fin rotating mechanism by which fin rotating mechanism the said fins can be rotated in the said pivoting manner in the same direction, which said tube is a primary tube, and which primary tube encircles part of the aircraft and is able to rotate relative to the encircled part of the aircraft, and with one of the said fins, a primary fin, connected to the primary tube such that the primary fin is located on the outside of the primary tube, with the primary fin connected to the primary tube by means of a connecting joint such that the primary fin can be rotated relative to the primary tube in a pivoting manner, which connecting joint is a primary connecting joint and which said primary fin has a protruding section, which protruding section is a primary protruding section, and which primary protruding section is connected to a stem, which stem is a primary activation stem, with another of the said fins, a secondary fin, connected to the primary tube such that the secondary fin is located on the outside of the primary tube, with a connecting joint used to connect the secondary fin to the said primary tube such that the secondary fin can be rotated relative to the primary tube in a pivoting manner, which said connecting joint that is used to connect the secondary fin is a secondary connecting joint, and which secondary fin has a protruding section that is a secondary protruding section, and which secondary protruding section is connected to a stem that is a secondary activation stem, with another tube that is an activation tube, and which activation tube is positioned on the aircraft such that the activation tube encircles part of the aircraft and such that the activation tube can be moved relative to the primary tube, which activation tube can be moved forcefully relative to the primary tube by means of an actuation mechanism, such that by forcefully moving the activation tube relative to the primary tube pressure can be applied to the primary activation stem and the secondary activation stem by means of the movement of the said activation tube and such that the primary activation stem and secondary activation stem can be pushed by movement of the activation tube, and as the primary activation stem is pushed the primary protruding section is moved such that the said primary fin is pivotly rotated relative to the primary tube, and as the secondary activation stem is pushed the secondary protruding section is moved such that the said secondary fin is pivotly rotated relative to the primary tube, and which fin rotating mechanism comprises the primary protruding section, the secondary protruding section, the primary activation stem, the secondary activation stem, the primary connecting joint, the secondary connecting joint, the activation tube and the actuation mechanism, and which fin rotating mechanism is such that by means of the fin rotating mechanism the fins can be rotated in the said pivoting manner and in the same direction such that during flight of the aircraft one of the fins connected to the primary tube can continuously exert a greater magnitude of force on the primary tube than can another of the said fins that is connected to the primary tube, with the length of one activation stem shorter than the length of another activation stem, such that during flight of the aircraft one of the said fins can be made to exert a greater magnitude of force on the said primary tube than another fin by means of the length of one activation stem being shorter relative to the length of another activation stem.

7. An aircraft comprising a spiral inducing assembly, said spiral inducing assembly providing means by which the aircraft can be forced to travel in a spiralling motion during flight of the aircraft, and which spiral inducing assembly comprises a tube, a plurality of fins connected to the tube such that the fins can be rotated in a pivoting manner relative to the tube, and a fin rotating mechanism by which fin rotating mechanism the said fins can be rotated in the said pivoting manner in the same direction, which said tube is a primary tube, and which primary tube encircles part of the aircraft and is able to rotate relative to the encircled part of the aircraft, and which fin rotating mechanism is such that by means of the fin rotating mechanism the fins can be rotated in the said pivoting manner and in the same direction such that during flight of the said aircraft one of the fins can continuously exert a greater magnitude of force on the primary tube than can another of the said fins, with sections of the primary tube creased and wheels attached to creased sections of the primary tube such that the wheels are able to freely wheel on the creased sections of the primary tube.

8. An aircraft comprising a spiral inducing assembly, said spiral inducing assembly providing means by which the aircraft can be forced to travel in a spiralling motion during flight of the aircraft, and which spiral inducing assembly comprises a tube, a plurality of fins connected to the tube such that the fins can be rotated in a pivoting manner relative to the tube, and a fin rotating mechanism by which fin rotating mechanism the said fins can be rotated in the said pivoting manner in the same direction, which said tube is a primary tube, and which primary tube encircles part of the aircraft and is able to rotate relative to the encircled part of the aircraft, and which fin rotating mechanism is such that by means of the fin rotating mechanism the fins can be rotated in the said pivoting manner and in the same direction such that during flight of the aircraft one of the fins can continuously exert a greater magnitude of force on the primary tube than can another of the said fins, with a hydraulicly activated extendable rod positioned between the primary tube and the part of the aircraft encircled by the primary tube, which hydraulicly activated extendable rod is able to be extended from the encircled part of aircraft to the primary tube so as to be able to create a frictional force on the primary tube.

9. The aircraft of claim 1
wherein the said fins can be rotated in a pivoting manner and in the same direction relative to the said primary tube such that if the aircraft had two sides, and if while looking at one side of the aircraft one fin could be seen to be rotating in a clockwise direction, then if another side of the aircraft had been looked at instead of the said one side, and another fin was seen to be rotating while looking at the said another side of the aircraft, the said another fin would have been seen to be rotating in an anti-clockwise manner, and wherein the said same direction of rotation of the fins is such that the direction of rotation of one fin is substantially the same as the direction of rotation of another fin.

\* \* \* \* \*